United States Patent [19]

Maruyama et al.

[11] Patent Number: 4,519,275
[45] Date of Patent: May 28, 1985

[54] TURNING CONTROL SYSTEM FOR A HYDRO-MECHANICAL TRANSMISSION

[75] Inventors: Ryoichi Maruyama; Takayoshi Nishijima; Hideaki Aida, all of Yokohama; Hideyuki Konishi, Kamakura; Keiji Hatayama, Yokohama, all of Japan

[73] Assignee: Kabushiki Kaisha Komatsu Seisakusho, Tokyo, Japan

[21] Appl. No.: 465,665

[22] Filed: Feb. 10, 1983

[30] Foreign Application Priority Data

Feb. 17, 1982 [JP] Japan .................. 57-22821

[51] Int. Cl.³ .................. B60K 41/18; F16H 47/04
[52] U.S. Cl. .................. 74/866; 74/687; 74/714
[58] Field of Search .................. 74/866, 687, 714; 364/424.1

[56] References Cited

U.S. PATENT DOCUMENTS

| | | | |
|---|---|---|---|
| 3,815,698 | 6/1974 | Reed | 74/720.5 X |
| 3,890,360 | 6/1975 | Prurot et al. | 74/866 X |
| 4,107,776 | 8/1978 | Beale | 74/866 X |
| 4,131,035 | 12/1978 | Mizuno et al. | 74/866 |
| 4,220,059 | 9/1980 | Mizuno et al. | 74/866 X |
| 4,229,998 | 10/1980 | Mizuno et al. | 74/866 |
| 4,253,347 | 3/1981 | Mizuno et al. | 74/866 X |
| 4,261,229 | 4/1981 | Mizuno et al. | 74/866 |
| 4,309,917 | 1/1982 | Leet | 74/687 X |
| 4,319,501 | 3/1982 | Sugimoto | 74/866 |
| 4,386,688 | 6/1983 | Sato et al. | 74/866 X |

*Primary Examiner*—George H. Krizmanich
*Assistant Examiner*—Dirk Wright
*Attorney, Agent, or Firm*—Armstrong, Nikaido, Marmelstein & Kubovcik

[57] ABSTRACT

A turning control system for a hydro-mechanical transmission of a vehicle including a mechanical transmission having a plurality of speed range change-over clutches, a pair of output shafts connected to the mechanical transmission, and pairs of hydraulic pumps and motors, each motor being operatively connected to the mechanical transmission. A turning of the vehicle is effected by changing displacement volume of one of the hydraulic pumps relative to the other pump to thereby change number of revolutions of one output shaft relative to the other output shaft. The turning control system includes a plurality of fluid pressure detection switches for detecting one of speed range change-over clutches currently engaged, a pair of motor speed detectors for detecting hydraulic motor speeds, an engine speed detector for detecting engine speed and a steering angle detector for detecting steering angle. Signals from the above recited switches and detectors are fed into an arithmetic unit where current value of radius of turning is compared with optimum radius of turning corresponding to the current steering angle stored therein and a turning signal is generated therefrom. A pair of adders are provided for sending out signals to actuators of the hydraulic pumps. The signals from the adders are such ones which will gradually approximate the turning signal to zero whereby optimum radius of turning corresponding to vehicle speed can be obtained automatically.

3 Claims, 2 Drawing Figures

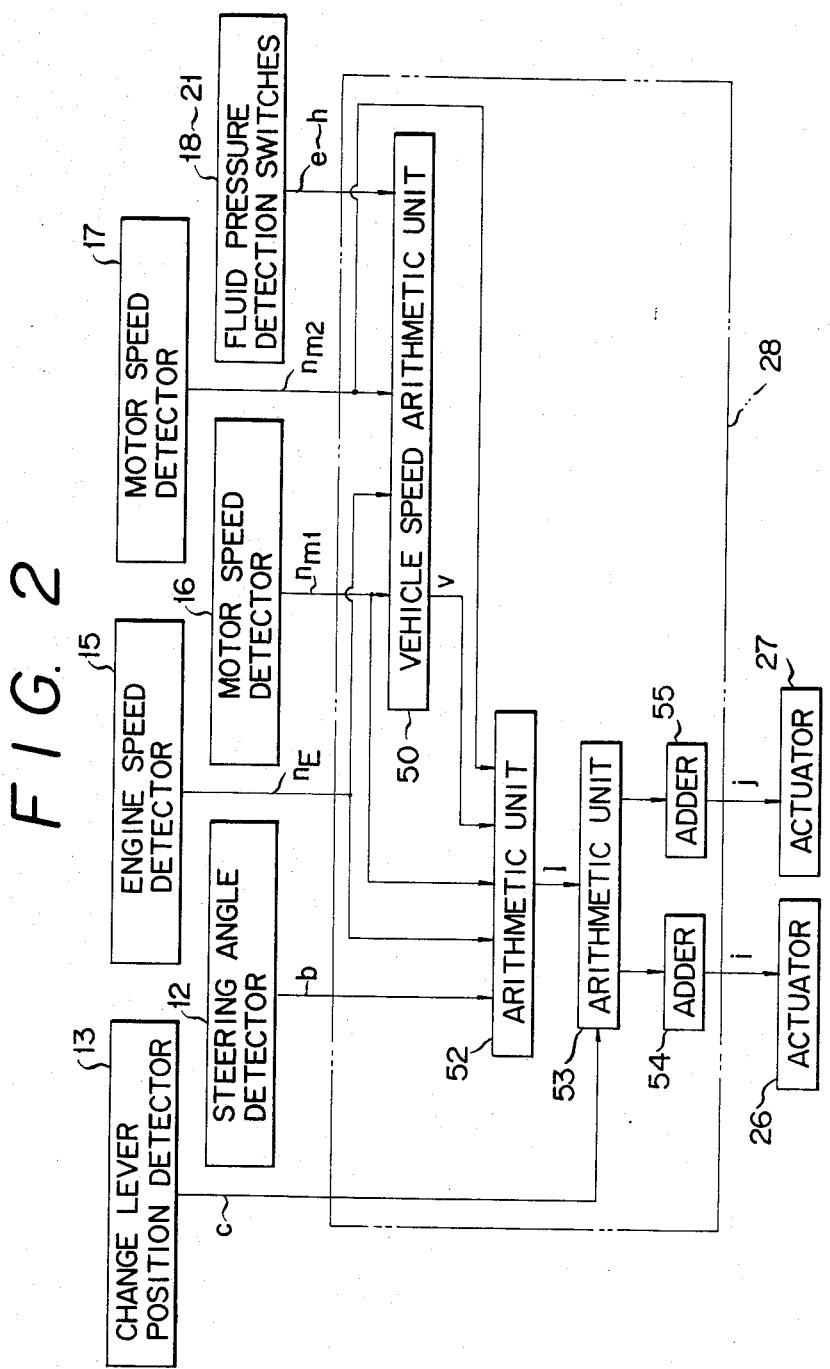

TURNING CONTROL SYSTEM FOR A HYDRO-MECHANICAL TRANSMISSION

BACKGROUND OF THE INVENTION

This invention relates to a turning control system for a hydro-mechanical drive and steering transmission of a vehicle.

A hydro-mechanical transmission is disclosed in U.S. Pat. No. 3,815,698 issued to Reed wherein power applied to the input of the transmission is utilized for hydraulic drive and steer in forward and reverse of a first range, and combined hydraulic drive and mechanical drive are utilized in a second higher range wherein steer remains a function of the hydraulic portion of the transmission. The transmission also includes a hydromechanical third range. Hydrostatic transmissions are characterized by a very high gain which provides a very rapid response to small control inputs, thereby requiring an accurate control and preferably a slow acting control to avoid abrupt changes of ratio. When a hydrostatic transmission has its output coupled to a multi-range gear set, thus providing a hydromechanical transmission, control of the hydrostatic unit ratio becomes important in avoiding undesirable shocks to the power train during range shifting of the gear set.

SUMMARY OF THE INVENTION

It is therefore an object of the present invention to provide a turning control system for a hydro-mechanical transmission of a vehicle wherein optimum radius of turning corresponding to the vehicle speed can automatically be obtained.

In accordance with an aspect of the present invention, there is provided a turning control system for a hydro-mechanical transmission of a vehicle including an engine, mechanical transmission means connected to the engine and having a plurality of speed range change-over clutches; a pair of output shafts connected to the mechanical transmission means, a pair of hydraulic pumps driven by the engine, a pair of hydraulic motors each driven by the respective hydraulic pumps and operatively connected to the mechanical transmission, and a change lever for changing forward and reverse running of the vehicle, said turning control system comprising: engine speed detector means for detecting an actual engine speed and generating a first signal; first motor speed detector means for detecting the speed of one of the hydraulic motors and generating a second signal; second motor speed detector means for detecting the speed of the other hydraulic motor and generating a third signal; means for selectively detecting one of the speed range change-over clutches currently engaged and generating a fourth signal; first arithmetic unit means for calculating vehicle speed based upon the first, second, third and fourth signals fed therein and generating a fifth signal indicating the vehicle speed; steering angle detector means for detecting steering angle and generating a sixth signal; second arithmetic unit means including memory means for memorizing pertinent radii of turning corresponding to steering angles, said second arithmetic unit means being adapted to compare current radius of turning with the pertinent radius of turning corresponding to the current steering angle and sends out a seventh signal; change lever position detector means for detecting change lever positions among neutral, forward and reverse positions and generating an eighth signal; third arithmetic unit means for feeding the seventh and eighth signal and generating a ninth signal; a pair of actuators for controlling displacement volume of the associated hydraulic pumps; and a pair of adder means each connected with said third arithmetic unit means and respective actuators, each of said adder means being adapted to feed said ninth signal and send out a tenth or eleventh signal to said respective actuators, said tenth and eleventh signal being such signals which will gradually approximate said seventh signal to zero.

The above and other objects, features and advantages of the present invention will be readily apparent from the following description taken in conjunction with the accompanying drawings.

BRIEF DESCRIPTION OF THE DRAWINGS

FIG. 2 is a block diagram of a turning control system according to the present invention.

DESCRIPTION OF THE PREFERRED EMBODIMENT

Figure 1:
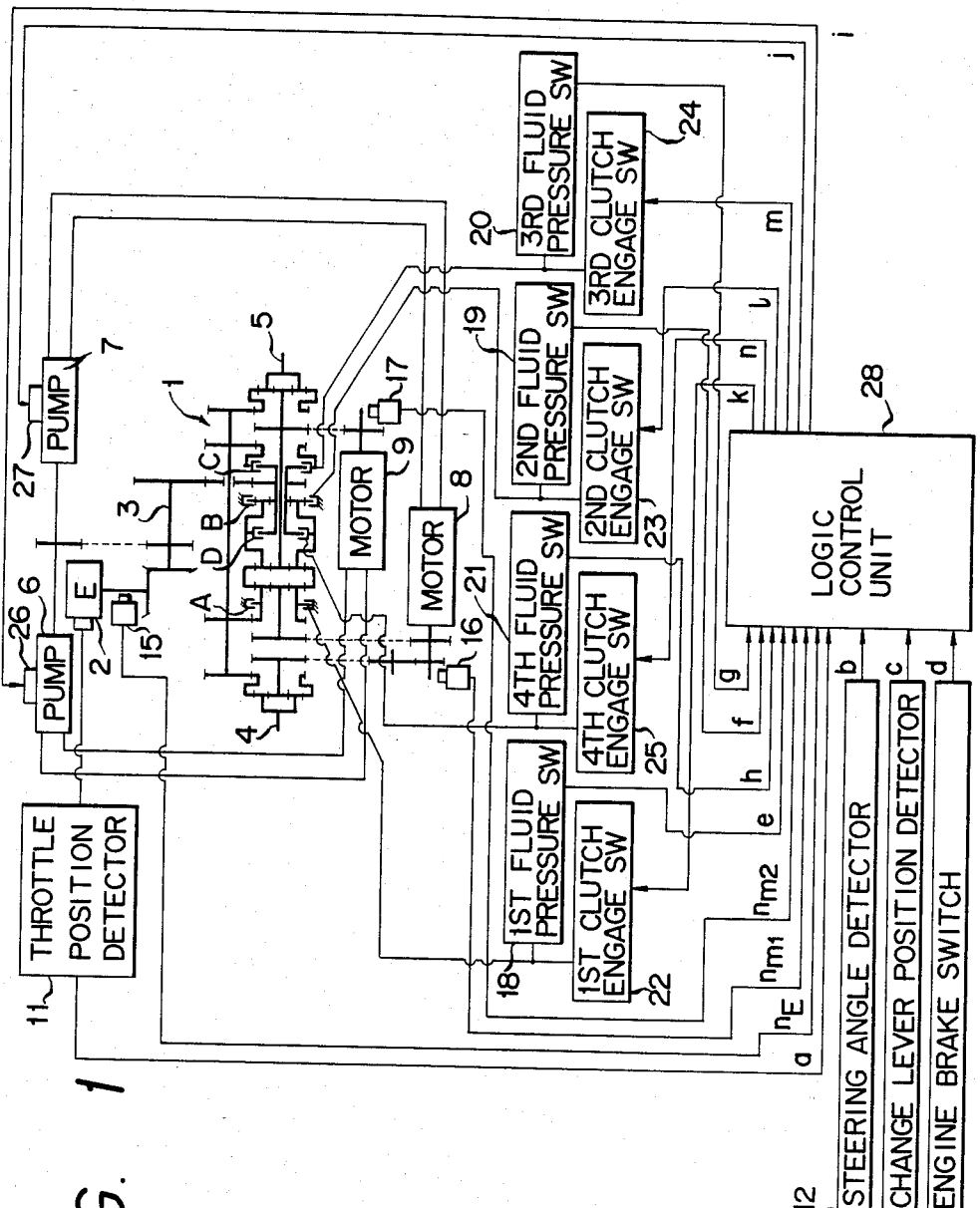
FIG. 1 is a block diagram showing an overall control system of a hydro-mechanical transmission of a vehicle employing a turning control system according to the present invention.

The present invention will now be described by way of example only with reference to the accompanying drawings.

FIG. 1 is a block diagram showing an overall control system of a hydro-mechanical transmission employing a turning control system according to the present invention.

In the drawings, reference numeral 1 denotes a mechanical transmission having an input shaft 3 connected to an engine 2, and two (left and right) output shafts 4 and 5; 6 and 7 two (left and right) hydraulic pumps driven by the engine 2; and 8 and 9 hydraulic motors driven by the pressurized fluid discharged from the hydraulic motors 6 and 7, respectively. Both the output shafts of the hydraulic motors 8 and 9 are connected to the mechanical transmission 1. The control of the hydraulic motors 8 and 9 enables the transmission 1 to effect stepless speed controls. The mechanical transmission 1 has a first speed range clutch A, a second speed range clutch B, a third speed range clutch C and a fourth speed range clutch D. The arrangement is made such that selective actuation of the respective clutches A, B, C and D enables the number of rotations of the output shafts 4, 5 to be changed into any of the first to fourth speeds.

Reference numeral 11 denotes a throttle position detector means adapted to detect the position of the throttle which controls the number of revolutions of the engine 2 and send out a signal "a"; 12 a steering angle detector adapted to detect the angle of rotation of a steering and generate a signal b; 13 a change lever position detector adapted to detect four positions of the change lever; that is, forward run, reverse run, neutral and spin turn positions of the change lever and send out a signal corresponding thereto; 14 an engine brake switch adapted to send out a signal d for applying an engine brake, and 15 an engine speed detector adapted to send out an engine speed signal $n_E$ corresponding to the actual engine speed. Reference numerals 16 and 17 denote motor speed detectors adapted to send out speed signals $n_{m1}$ and $n_{m2}$ of the hydraulic motors 8 and 9, respectively, 18, 19, 20 and 21 fluid pressure detection switches adapted to detect the fluid pressures applied to the first, second, third and fourth speed range clutches A, B, C and D, respectively, and send signals e, f, g and h corresponding thereto; 22, 23, 24 and 25 clutch engage switches adapted to control the aforementioned first, second, third and fourth speed range clutches A, B, C and D, respectively; and 26 and 27 actuators adapted to control the amount of fluid displacement of the hydraulic pumps 6 and 7, respectively. Reference numeral 28 denotes a logic control unit which is adapted to receive the above-mentioned input signals a, b, c, d, e, f, g, h and $n_E$, $n_{m1}$ and $n_{m2}$ and send out, in response to the input signals, output signals i and j to the actuators 26 and 27 adapted to control the amount of the fluid displacement of the hydraulic pumps 6 and 7, respectively, and output signals k, l, m and n to the first, second, third and fourth clutch engage switches 22, 23, 24 and 25, respectively.

The hydro-mechanical transmission shown in FIG. 1 is adapted to cause a difference in the amount of pressurized fluid discharged from the left and right hydraulic pumps 6 and 7 which results in a difference in the rotating speeds of the left and right output shafts 4 and 5 thereby turning the vehicle. Because the hydraulic pumps 6 and 7 enable an infinitely variable transmission to be achieved, it is possible for the operator to turn the vehicle at any desired turning radius. Further, the vehicle can be controlled so that an optimum turning radius may be obtained from the steering angle $\theta$ and the vehicle speed V.

An example of the turning control system will be described below with reference to FIG. 2.

The arrangement is made such that the turning control is rendered effective when the steering angle $\theta$ is larger than the idle angle $\theta_0$ of the steering wheel. Further, the steering angle $\theta$ is zero at its neutral position.

An engine speed signal $n_E$ generated by an engine speed detector 15, motor speed signals $n_{m1}$ and $n_{m2}$ generated by the left and right motor speed detectors 16 and 17 and any one of speed range signals e, f, g and h generated by a fluid pressure detection switch 18, 19, 20 or 21 for a speed range currently engaged are all sent to a vehicle speed arithmetic unit 50 where the operation of the vehicle speed V for the speed range at that time is made to generate a vehicle speed signal v.

The vehicle speed signal v, a steering angle signal b generated by a steering angle detector 12, the engine speed signal $n_E$ generated by the engine speed detector 15 and the motor speed signals $n_{m1}$ and $n_{m2}$ are all sent to an arithmetic unit 52. The arithmetic unit 52 has a memory formed therein for memorizing optimum radii of turning corresponding to steering angles. In the arithmetic unit 52, current value of radius of turning is obtained by the operation of incoming signals and is compared with an optimum radius of turning corresponding to the current steering angle stored therein and a turning signal I is generated therefrom. The arrangement is made such that the turning signal I becomes zero when an optimum turning radius is obtained from the steering angle $\theta$ and the vehicle speed V. The signals i and j are sent from adders 54 and 55 to the actuators 26 and 27 adapted to control the amount of the pressurized fluid discharged from the hydraulic pumps 6 and 7, respectively, so that the turning signal I may approach zero when the turning signal I and the change lever position signal c are received and operated by the arithmetic unit 53.

Further, in this turning control, at low vehicle speeds the turning radius relative to the steering angle $\theta$ is determined at the proportion of one to one regardless of the vehicle speed; whilst at high vehicle speeds, control is made so that the centripetal acceleration may be kept constant relative to the steering angle $\theta$.

The above-mentioned adders 54 and 55 are arithmetic units which function to add turning signal $+I$ and $-I$ to the signals i and j being generated at a given moment.

Since the present invention is arranged as mentioned hereinabove, an optimum turning angle can be obtained from the steering angle $\theta$ and the vehicle speed V.

What is claimed is:

1. A turning control system for a hydro-mechanical transmission of a vehicle including an engine, mechanical transmission means connected to the engine and having a plurality of speed range change-over clutches, a pair of output shafts connected to the mechanical transmission means, a pair of hydraulic pumps driven by the engine, a pair of hydraulic motors each driven by the respective hydraulic pumps and operatively connected to the mechanical transmission, and a change lever for changing forward and reverse running of the vehicle, said turning control system comprising:

engine speed detector means for detecting an actual engine speed and generating a first signal;

first motor speed detector means for detecting the speed of one of the hydraulic motors and generating a second signal;

second motor speed detector means for detecting the speed of the other hydraulic motor and generating a third signal;

means for selectively detecting one of the speed range change-over clutches currently engaged and generating a fourth signal;

first arithmetic unit means for calculating vehicle speed based upon the first, second, third and fourth signals fed therein and generating a fifth signal indicating the vehicle speed;

steering angle detector means for detecting steering angle and generating a sixth signal;

second arithmetic unit means including memory means for memorizing optimum radii of turning corresponding to steering angles, said second arithmetic unit means being adapted to compare current radius of turning with the optimum radius of turning corresponding to the current steering angle and vehicle speed and send out a seventh signal;

change lever position detector means for detecting change lever positions among neutral, forward and reverse positions and generating an eighth signal;

third arithmetic unit means for feeding the seventh and eighth signal and generating a ninth signal;

a pair of actuators for controlling displacement volume of the associated hydraulic pumps; and a pair of adder means each connected with said third arithmetic unit means and respective actuators, each of said adder means being adapted to feed said ninth signal and send out a tenth or eleventh signal to said respective actuators, said tenth and eleventh signals being such signals which will gradually approximate said seventh signal to zero.

2. A turning control system according to claim 1 wherein said means for selectively detecting one of the speed range change-over clutches currently engaged comprises a plurality of fluid pressure detection switches for detecting fluid pressure of the speed range change-over clutches.

3. A turning control system according to claim 1 wherein said change lever position detector means is adapted to detect change lever positions among neutral, forward, reverse and spot turn positions.

* * * * *